Patented Dec. 24, 1929

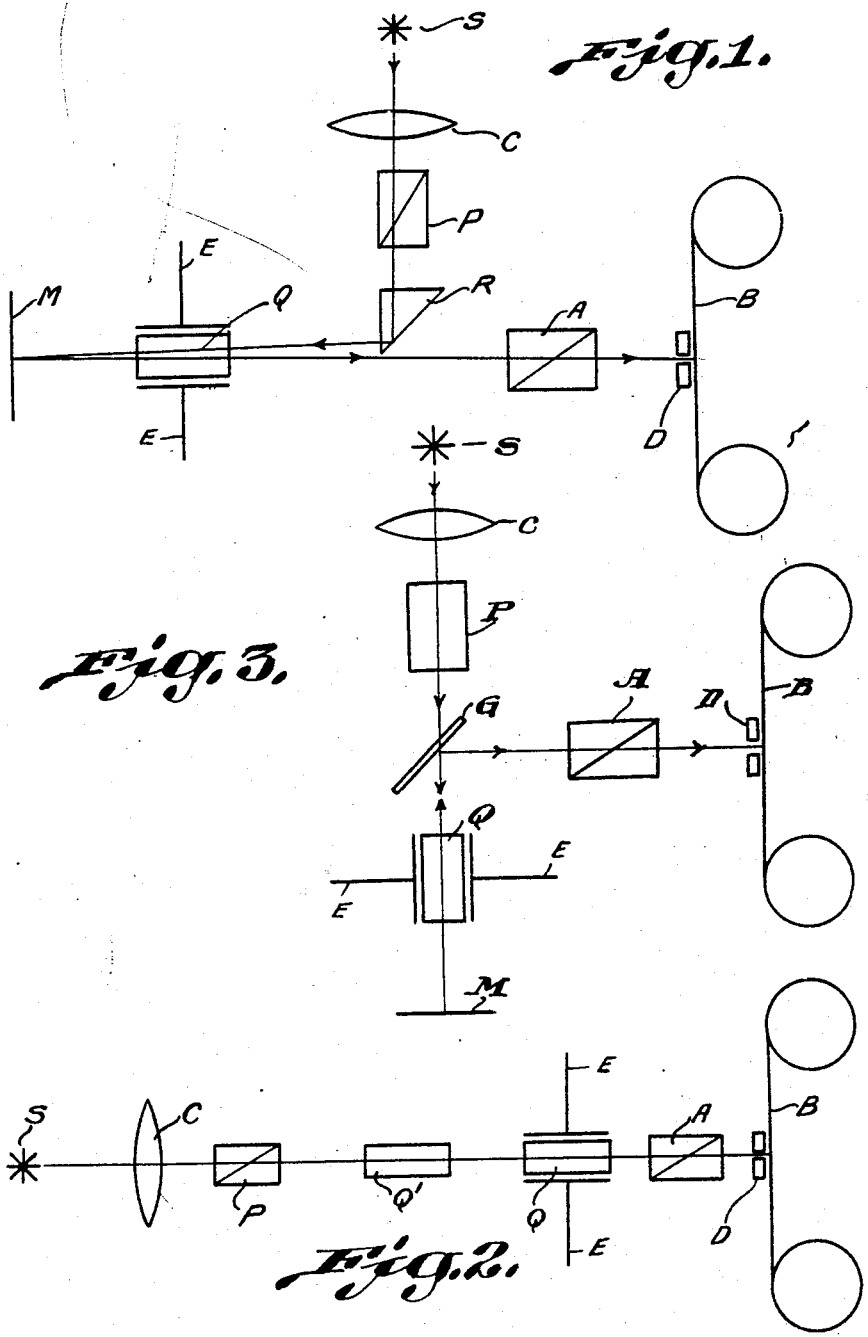

1,740,673

UNITED STATES PATENT OFFICE

ALFRED WHITAKER, OF WEST DRAYTON, AND CECIL OSWALD BROWNE, OF EALING COMMON, ENGLAND, ASSIGNORS TO VICTOR TALKING MACHINE COMPANY, A CORPORATION OF NEW JERSEY

LIGHT-CONTROLLING MEANS

Application filed December 15, 1928, Serial No. 326,272, and in Great Britain December 9, 1927.

The present invention (for which we have filed application for patent in Great Britain on December 9, 1927) relates to means for controlling the intensity of a beam of light in accordance with electrical oscillations for use for example in recording sounds.

It is known that certain bodies have the property, when subjected to electrostatic stress, of becoming doubly refracting or, if they are initially doubly refracting, of having this property modified in degree. The effect produced by the body will, for convenience in this specification, be referred to as a rotation of the plane of polarization.

If a beam of plane polarized light be passed through a body of this type, which is at least partially transparent, and then through an analyzer, the intensity of the light emerging from the analyzer will vary in accordance with the electrostatic stress applied to the body. In the case of a certain limited group of materials, amongst which is quartz, the relation between the potential difference applied to two opposite faces of a crystal of the material and the resulting change in light intensity is substantially linear. It has, however, been found that if the light used is not monochromatic, dispersion takes place, that is to say the setting of the analyzer necessary to produce extinction of the light is different for each colour and sharp extinction of the light cannot therefore be obtained. Moreover, it is not usually possible to use monochromatic light since convenient light sources are not monochromatic and the production of monochromatic light therefore involves the use of filters by which the efficiency is seriously reduced, owing to the wastage of the unwanted portion of the spectrum.

According to the present invention, in a device for controlling the intensity of a beam of light in accordance with electrical variations, in which polarized light is first passed through a body which is under the influence of said electrical variations and then through an analyzing device and in which said body produces dispersion of the light passing therethrough, means are provided for correcting the dispersion.

According to another aspect of the present invention, in a device for controlling in accordance with electrical variations, the intensity of a beam of polarized light comprising light of more than one wavelength in which the light is first passed through a body, which is under the influence of the electrical variations, and then through analyzing means, the light path in said body is of such length that the rotation of the plane of polarization of the light of one of said wave lengths is greater than the rotation of the plane of polarization of the light of another of said wavelengths by substantially 180° or some multiple thereof.

The invention will be described with reference to the accompanying drawings in which two forms of the invention are illustrated by way of example.

In said drawings, Fig. 1 illustrates diagrammatically one form of apparatus embodying the invention;

Fig. 2 shows a modified form of apparatus likewise embodying the invention; and

Fig. 3 shows a further form of apparatus embodying the invention.

Referring to Fig. 1, light from a suitable source S is passed first through collimating lens C and then through a polarizing device P, such as a Nicol prism, to a prism R by which it is reflected substantially at right angles through a quartz crystal Q on to a mirror M from which it is reflected at an acute angle to the incident beam back through the same quartz crystal Q and, just missing the prism R, through an analyzing device A, such as another Nicol prism, arranged at a suitable angle to the first. The electrical oscillations, which are to control the intensity of the light beam, are applied between conductors or electrodes E arranged as shown upon two opposite faces of the crystal Q. The adjustment of the analyzer is preferably such that when the maximum potential difference, which will be met with in operation, is applied to the conductors, the extinction of the light is substantially complete. The orientation of the prisms P and A should however be adjusted for best results in order to avoid elliptical polarization at the prism R.

The dispersion produced by the passage of the light through the crystal Q in one direction is corrected by the equal and opposite dispersion produced by the passage of the light through the crystal in the opposite direction, but the effect of the electrostatic stress upon the light beam is double that produced in one passage through the crystal.

When it is desired to record the electrical variations the light beam passes from the analyzer A, through an optical slit D on to a travelling sensitive film B.

In a modification of the apparatus above described, shown in Fig. 3, the light is passed first through a polarizing device P, and some of the light then passes through a piece of thin clear glass G arranged at an angle, for example 45°, to the light beam and then through the quartz crystal Q on to a mirror M arranged at right angles to the light beam. The light is then reflected back along its original path through the crystal Q, and part of the light is reflected at the clear glass G through an analyzing device A.

In the embodiment of the invention above described, the direction of the light is reversed and it is reflected back through the crystal Q. In some instances the effects of dispersion may be eliminated without reversing the direction of the light. Referring to Fig. 2, it will be seen that light from a source S passes through a lens C, a polarizing device P, two quartz crystals Q' and Q, through an analyzing device A and an optical slit D on to the film B. The crystals Q' and Q are selected to produce equal and opposite rotations of the polarized light and the electrical variations are applied only to the crystal Q. In cases where a light source is employed which emits mainly light of a relatively small number of different wave lengths, the invention may be embodied in an arrangement like that of Fig. 2 so that the effects of dispersion are eliminated without reversing the direction of the light, the crystal Q' being omitted and the length of the path in the quartz crystal or other body Q being so selected that the rotations produced in the case of the several wave lengths are separated from one another by 180° or a multiple thereof. For example in the case of a mercury arc which emits mainly light of two wave lengths, namely 5461Å (green) and 4358Å (violet), the rotation produced per millimeter of length of the path in quartz is approximately 25° and 42° for the two wave lengths respectively. A simple calculation shows that one wave length can be rotated 180° more than the other with a length of path in quartz of 1 centimetre.

While three embodiments of the invention have been illustrated and described, it is to be expressly understood that the invention is not limited thereto, since changes may be made in the individual elements and in the arrangement of the parts without departing from the spirit of the invention. Reference is therefore to be had to the appended claims for a definition of the limits of the invention.

What is claimed is:

1. Apparatus for controlling the intensity of a beam of light in accordance with electrical variations comprising polarizing means, analyzing means, means for rotating the plane of polarization and controlled by said electrical variations, said means being interposed in the path of said light beam between said polarizing and analyzing means, and having dispersive characteristics, and reflecting means for passing said light beam through said last named means whereby compensating dispersion is produced.

2. Apparatus for controlling the intensity of a beam of light in accordance with electrical variations comprising a light source, a polarizing device, an analyzing device, a controlling device subjected to said electrical variations and interposed in the path of light from said polarizing device, said controlling device having dispersive characteristics, and means for reflecting light from said controlling device back through the same in the opposite direction and to said analyzing device.

3. Apparatus for controlling the intensity of a beam of light in accordance with electrical variations comprising a polarizing prism, a crystal interposed in the path of the light from said prism, means to subject said crystal to said electrical variations, means for reflecting light from said crystal back through the same in the opposite direction, and an analyzing prism in the path of the reflected light leaving said crystal.

4. Apparatus for controlling the intensity of a beam of light in accordance with electrical variations comprising a light source, a polarizing prism, a reflecting prism, a crystal interposed in the path of the reflected light from said reflecting prism, means to subject said crystal to said electrical variations, a mirror mounted to reflect the light back through said crystal at an acute angle to the path of the light leaving said crystal, and an analyzing prism intercepting the light reflected by said mirror through said crystal.

In testimony whereof, we have signed our names to this specification at Hayes in the county of Middlesex, England, this twenty-sixth day of November, 1928.

ALFRED WHITAKER.
CECIL OSWALD BROWNE.